(12) United States Patent
Park

(10) Patent No.: US 9,144,072 B2
(45) Date of Patent: Sep. 22, 2015

(54) METHODS AND ARRANGEMENTS TO ASSIGN SLOTS IN RESTRICTED ACCESS WINDOWS IN WIRELESS NETWORKS

(71) Applicant: Minyoung Park, Portland, OR (US)

(72) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 13/730,972

(22) Filed: Dec. 29, 2012

(65) Prior Publication Data

US 2014/0071900 A1 Mar. 13, 2014

Related U.S. Application Data

(60) Provisional application No. 61/698,557, filed on Sep. 7, 2012.

(51) Int. Cl.
*H04W 72/04* (2009.01)
*H04W 74/04* (2009.01)

(52) U.S. Cl.
CPC .......... *H04W 72/0446* (2013.01); *H04W 74/04* (2013.01)

(58) Field of Classification Search
CPC . H04W 40/22; H04W 72/04; H04W 72/0426; H04W 72/0446; H04W 74/006; H04W 74/04; H04W 80/02
USPC .......................... 370/329, 338, 252, 442, 458
See application file for complete search history.

(56) References Cited

U.S. PATENT DOCUMENTS

| 8,374,140 | B2 * | 2/2013 | Hu ................................. | 370/329 |
|---|---|---|---|---|
| 8,559,464 | B2 * | 10/2013 | Caracas et al. ................ | 370/503 |
| 2005/0047386 | A1 | 3/2005 | Yi | |
| 2007/0230497 | A1 * | 10/2007 | Choi et al. ..................... | 370/442 |
| 2008/0075109 | A1 * | 3/2008 | Zangi ............................ | 370/458 |
| 2008/0232345 | A1 * | 9/2008 | Espina et al. ................. | 370/350 |
| 2009/0067389 | A1 * | 3/2009 | Lee et al. ...................... | 370/336 |
| 2009/0161622 | A1 * | 6/2009 | Sugaya ......................... | 370/329 |

(Continued)

FOREIGN PATENT DOCUMENTS

WO 2014/039152 A1 3/2014

OTHER PUBLICATIONS

Ghosh et al., "Restricted Access Window Signaling for Uplink Channel Access", IEEE 802.11-12/0843r0, Jul. 16, 2012, 13 Pages.

(Continued)

*Primary Examiner* — Robert Wilson
*Assistant Examiner* — Sai Aung
(74) *Attorney, Agent, or Firm* — Schubert Law Group PLLC

(57) ABSTRACT

Logic may implement a slot assignment scheme that uses information provided in traffic indication map (TIM) information element (IE) and restricted access window (RAW) parameter set (PS) IE to determine a station-to-slot mapping function for communication of slot assignments to stations for RAWs. The TIM IE may comprise a bitmap indicating paged and unpaged stations. The RAW PS IE may comprise a duration and a slot duration. Logic may implement the station-to-slot function by determining the number of slots in a RAW and correlating slot assignments for stations based upon a position for the station in the TIM bitmap. The TIM bitmap may identify each station via a bit on a page in the bitmap based upon an assignment of the station to a position in the TIM bitmap. The station-to-slot mapping function may use an offset for fair access.

23 Claims, 8 Drawing Sheets

(56) References Cited

U.S. PATENT DOCUMENTS

| | | |
|---|---|---|
| 2010/0135167 A1 | 6/2010 | Ma et al. |
| 2010/0278062 A1* | 11/2010 | Abraham et al. ............ 370/252 |
| 2011/0038343 A1* | 2/2011 | Bhatti et al. ................. 370/330 |
| 2011/0090880 A1* | 4/2011 | Abraham et al. ............ 370/338 |
| 2012/0008522 A1 | 1/2012 | Ng et al. |
| 2012/0213168 A1 | 8/2012 | Wang et al. |
| 2014/0003414 A1* | 1/2014 | Choudhury et al. ......... 370/347 |

OTHER PUBLICATIONS

International Search Report and Written Opinion received for Patent Application No. PCT/US2013/048826, mailed on Oct. 22, 2013, 11 pages.

International Preliminary Report on Patentability and Written Opinion received for PCT Patent Application No. PCT/US2013/048826, mailed on Mar. 10, 2015, 7 pages.

* cited by examiner

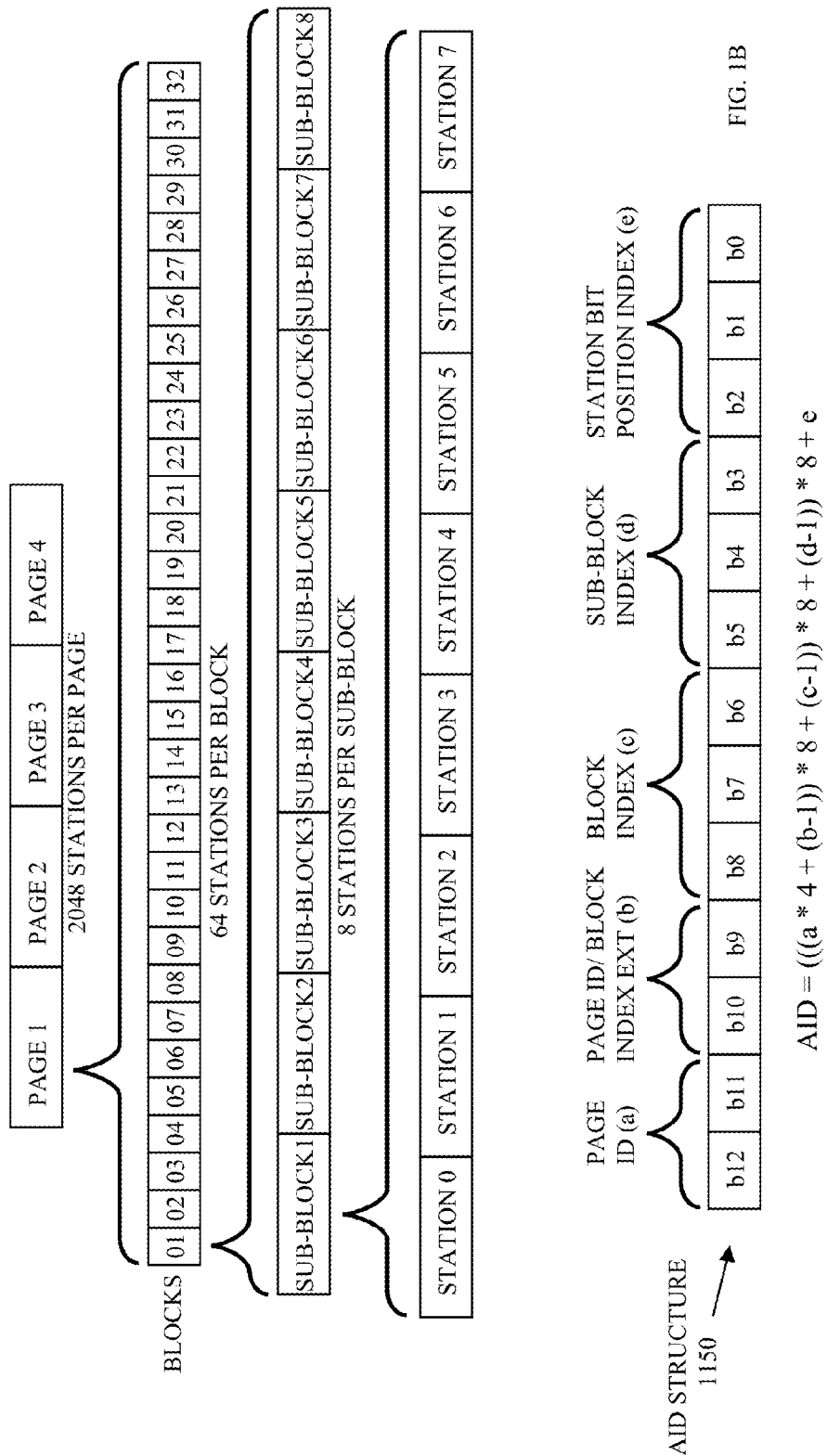

FIG. 1F

Management Frame 1500

| MANAGEMENT FRAME OCTETS | 2 | | 0-2312 | | 4 |
|---|---|---|---|---|---|
| | FRAME CONTROL 1502 | OTHER MAC HEADER FIELDS 1508 | FRAME BODY 1514 | | FCS 1526 |
| | | | | TIM IE 1520 | |

MAC HEADER 1501

FIG. 1G

TIM INFORMATION ELEMENT (IE) 1600

| ELEMENT ID 1602 | LEN 1606 | DTIM COUNT 1608 | DTIM PERIOD 1610 | TIM PERIOD PARAMETER 1611 | TIM BITMAP CONTROL FIELD 1612 | TIM BITMAP 1614 |
|---|---|---|---|---|---|---|

FIG. 1H

Management Frame 1700

| MANAGEMENT FRAME OCTETS | 2 | | VARIABLE | | 4 |
|---|---|---|---|---|---|
| | FRAME CONTROL 1702 | OTHER MAC HEADER FIELDS 1708 | FRAME BODY 1714 | | CRC 1726 |
| | | | | RAW PS IE 1720 | |

MAC HEADER 1701

FIG. 1I

RAW Parameter Set IE 1800

| ELEMENT ID 1802 | LEN 1806 | PAGE ID 1808 | BLOCK OFFSET 1810 | BLOCK RANGE 1812 | RAW START TIME 1814 | RAW DURATION 1815 | PAGED STA ONLY 1816 | GROUP/ RESOURCE ALLOCAT FIELD 1818 | SLOT DEF 1820 |
|---|---|---|---|---|---|---|---|---|---|

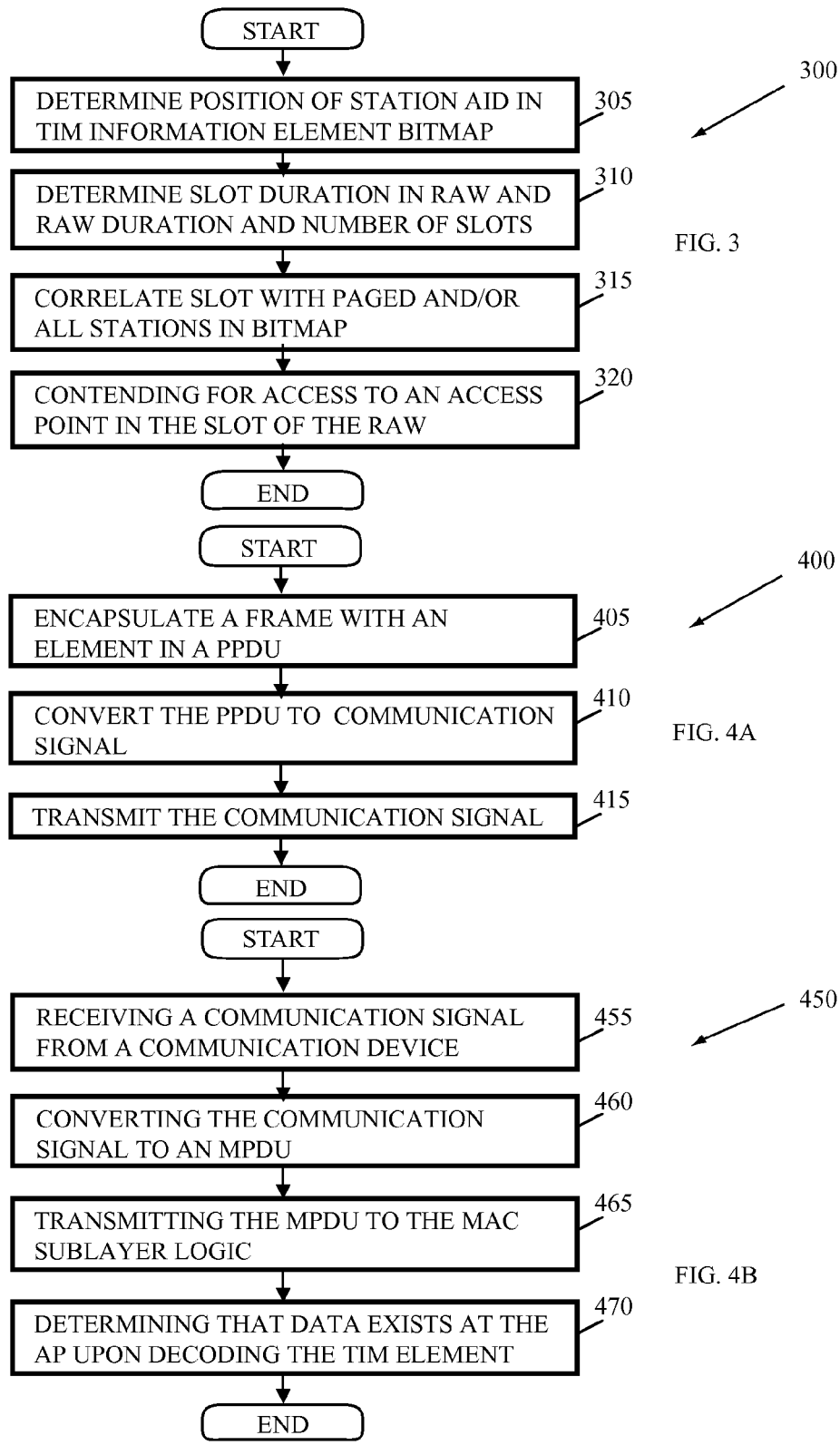

METHODS AND ARRANGEMENTS TO ASSIGN SLOTS IN RESTRICTED ACCESS WINDOWS IN WIRELESS NETWORKS

BACKGROUND

Embodiments are in the field of wireless communications. More particularly, embodiments are in the field of communications protocols between wireless transmitters and receivers.

BRIEF DESCRIPTION OF THE DRAWINGS

FIGS. 1A-B depict embodiments of a hierarchical data structure for traffic indication mapping an association identifier for the hierarchical data structure illustrated in FIG. 1A;

FIGS. 1F-I depicts embodiments of management frames and frame elements for determining a slot assignment for a station in a restricted access window;

FIG. 3 depicts an embodiment of a flowchart to generate a frame with a partial virtual bitmap based upon a hierarchical data structure for traffic indication mapping; and FIGS. 4A-B depict embodiments of flowcharts to transmit, receive, and interpret communications with frames as illustrated in FIGS. 1-2.

DETAILED DESCRIPTION OF EMBODIMENTS

Figure 1:
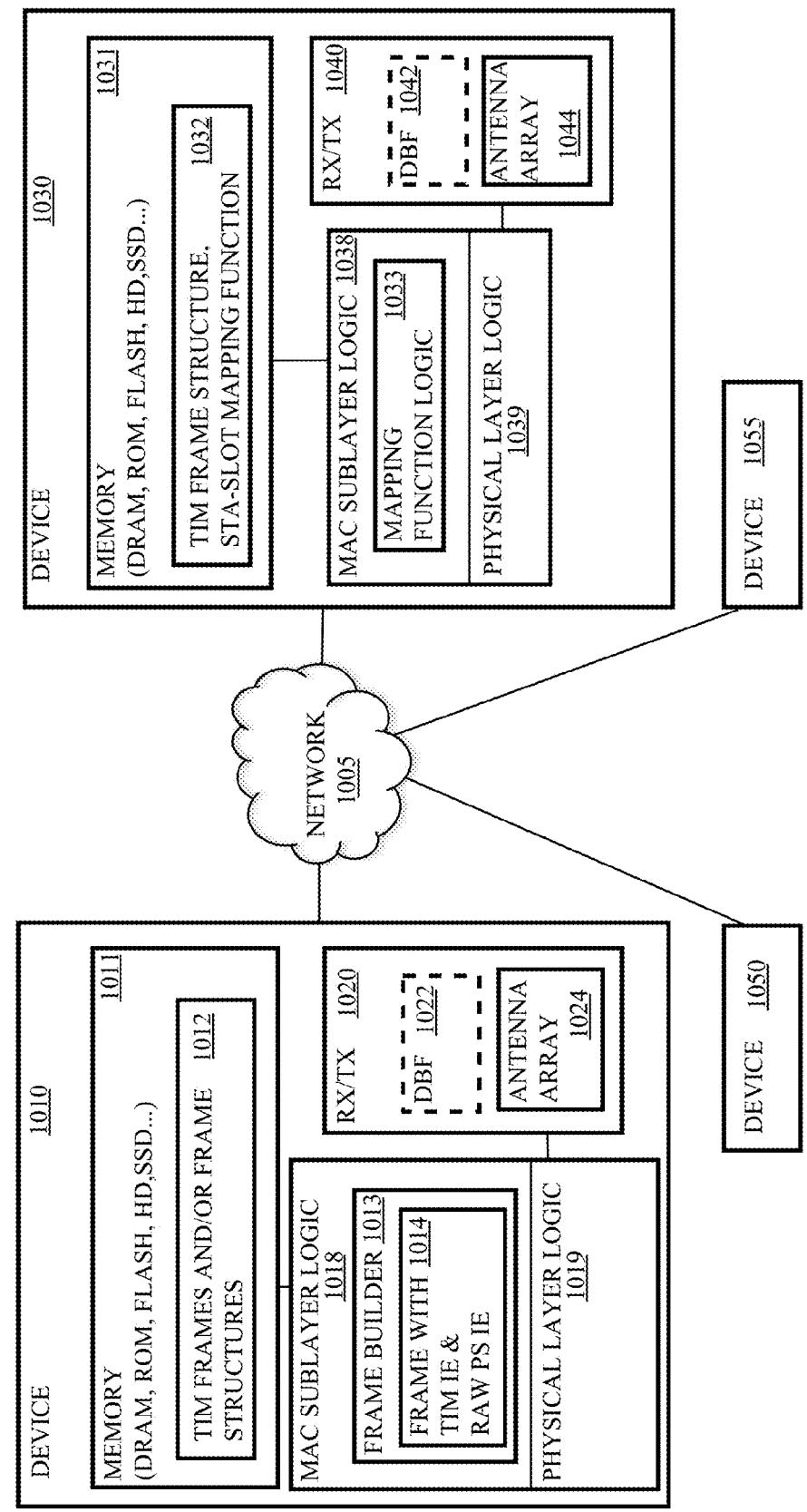
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may implement a slot assignment scheme that uses information provided in traffic indication map (TIM) information element (IE) and restricted access window (RAW) parameter set (PS) information element (IE) to determine a station-to-slot mapping function to facilitate communication of slot assignments to stations for RAWs. In several embodiments, the TIM IE may comprise a bitmap to indicate paged and unpaged stations. The RAW PS IE may comprise a RAW duration and a slot duration, and, in some embodiments, may comprise a slot definition indicating whether a transmission by a station during a slot in a RAW may cross a slot boundary. MAC logic may implement the station-to-slot function by determining the number of slots in a RAW and calculating or otherwise correlating slot assignments for stations based upon the TIM bitmap. The TIM bitmap identifies each station via a bit on a page at the station's association identifier (AID) in the bitmap based upon an assignment of the station to a position in the TIM bitmap. Many embodiments comprise MAC logic to generate and transmit frames such as PS Polls for downlink bufferable unit (BU) delivery during a RAW.

The RAW PS IE may comprise a RAW duration during which stations may be assigned slots of time for accessing the access point as well as a RAW slot duration. For instance, a station may have data to transmit to the access point via an uplink channel access during a slot assigned to the station or the station may transmit a power-saving poll to the access point to trigger or initiate a transmission of data buffered by the access point for the station. The data buffered at the access point may be referred to as a bufferable unit (BU) and may comprise, e.g., a medium access control (MAC) service data unit (MSDU), an aggregated MSDU (A-MSDU), or bufferable MAC management protocol data unit (MMPDU) that is buffered to operate the power saving protocol.

In several embodiments, each station may be assigned with a slot boundary in a RAW at which time the station is allowed to start to contend for channel access. One way to signal mapping between STAs and slots in a RAW is to use information provided in TIM IE and RAW PS IE in a pre-defined a station-to-slot mapping function. For example, in many embodiments, the MAC logic of a station may obtain the RAW duration (Traw) and the slot duration (Ts) defined in the RAW PS IE. The station may derive the number of slots in a RAW (Nraw) by dividing the RAW duration (Traw) with the slot duration (Ts), Nraw=Traw/Ts.

In some embodiments, the station-to-slot mapping function may then be X modulus Nraw=Islot (the slot assigned to the station), wherein X is the position of the station. In further embodiments, only the positions of the paged stations in the TIM bitmap may be associated with slots in the RAW. In other words, the unpaged stations may not be associated with slots in the RAW. For instance, the Xth paged station in the TIM bitmap may be assigned to the ith slot in the RAW.

In other embodiments, the station-to-slot mapping function may be f(x)=(X+Noffset) modulus Nraw=Islot (the slot assigned to the station). Noffset may be implemented to change the order of the stations assigned to contention windows to provide fair access to the stations for communicating with the access point. In such embodiments, the position of the station (X) in the TIM bitmap may vary depending upon whether the access point limited communications during the RAW to paged stations or has left the communications open to both the paged stations and the unpaged stations. For instance, if the RAW is defined for both paged and unpaged stations, X may be the AID of a station or some portion thereof. On the other hand, if the RAW is restricted to paged stations only, X may be the position index of a paged station among all the paged stations when sequentially arranged based on their AIDs. For example, if there are N paged stations in front of the paged station, X=N (assuming that the first paged station's bit position is defined to be X=0).

In several embodiments, the Noffset may change between beacon intervals. In some embodiments, the Noffset may change each beacon interval to a different value for the mapping function to provide fairness among the stations indicated in the TIM. Noffset may be provided in a number of ways such as via a field in the RAW PS IE, by using an value from a field of a received beacon frame for Noffset (Timestamp, FCS, etc.), or by calculating the index of a received beacon frame via a calculation such as Noffset=Timestamp/Beacon Interval (BI).

Various embodiments may be designed to address different technical problems associated with assigning slots to stations in a restricted access window. For instance, some embodiments may be designed to address one or more technical problems such as assigning the slots via an implicit indication, based on TIM, so that the beacon is not overloaded.

Different technical problems such as those discussed above may be addressed by one or more different embodiments. For instance, some embodiments that are designed to address assigning slots to stations in a restricted access window may do so by one or more different technical means such as dividing the restricted access window duration by the slot duration to determine the number of slots in the restricted access window. Further embodiments that are designed to assign the slots via an implicit indication, based on TIM, so that the Beacon is not overloaded may do so by one or more different technical means such as dividing the stations into groups for each of the time slots based upon their station AID or their position within the TIM bitmap, determining an offset that changes to promote fair access amongst the stations, determining the offset based upon a field value in a beacon such as a timestamp or frame check sequence, calculating an offset based upon a timestamp and a beacon interval, calculating the slot assignment, f(x), based on the position of the station(x) modulo the number of slots (Nraw), and/or the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

According to one embodiment, the TIM bitmap based upon the hierarchical data structure for traffic indication mapping is defined to enable a greater number of associated stations and to utilize a more efficient TIM element and, in many instances, smaller TIM element for low-power consumption stations such as small battery-powered wireless devices (e.g., sensors) to use Wi-Fi to connect to the Internet with very low power consumption.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services may generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water usage meter.

Initially, the communications device 1030 may associate with the communications device 1010 and receive an association identifier (AID) from the communications device 1010 to uniquely identify the communications device 1030 with respect to other communications devices associated with the communications device 1010. In many embodiments, the AID may comprise 13 bits, wherein the bits identify the page, block, sub-block, and a bit position for the station within the sub-block. FIG. 1B depicts an embodiment of such an AID structure 1150. Thereafter, the communications device 1010 may buffer data such as medium access control (MAC) service data units (MSDUs) for the communications device 1030.

After buffering an MSDU for the communications device 1030, the communications device 1010 may transmit a beacon to associated devices, identifying the devices with data buffered by the communications device 1010 by means of a traffic indication map (TIM) information element such as the frame 1014. In the present embodiment, the TIM information element may identify the AID of each station that has data buffered such as the communications device 1030 by identifying the page, the block, and, depending upon the encoding of the block, the sub-block of the stations. The TIM information element may also comprise a number of bits such as eight bits that identify the stations in the sub-block that have buffered data via logical ones and zeroes. In many embodiments, a logical one at the bit location in the sub-block associated with the communications device 1030 may indicate that the communications device 1010 is buffering data for the communications device 1030. In further embodiments, a logical zero may represent that the communications device 1010 is buffering data for the communications device 1030.

In several embodiments, the communications device 1030 may receive a restricted access window parameter set information element (RAW PS IE) either in the same beacon as the TIM bitmap or in another frame transmission. The RAW PS IE may identify a duration (Traw) for the restricted access window and a mapping function logic 1033 of the communications device 1030 may determine, based upon a station-to-slot function in associated with the RAW PS IE an the TIM bitmap, a slot during which the communications device 1030 may contend for access to the communications device 1010.

Each station such as the communications devices 1030, 1050, and 1055 may maintain the station-to-slot function in memory such as the memory 1031 or may maintain the station-to-slot function in firmware, code, or hardware such as a state machine. In some embodiments, the station-to-slot function may be updated and, in other embodiments, the station-to-slot function cannot be updated.

In some embodiments, the communications device 1010 may restrict the usage of the restricted access window to paged stations. Paged stations refer to stations that have data buffered by the communications device 1010 and these stations are identified in the TIM bitmap of the TIM information element. If the restricted access window is limited to paged stations, the communications device 1030 may interpret the TIM information element based upon the association identifier assigned to the communications device 1030 by the communications device 1010. In many embodiments, the communications device 1030 may parse the association identifier to determine a page associated with communications device 1030 and may parse the TIM information element to determine if the TIM information element describes data buffering for stations associated with the same page. If so, the communications device 1030 may parse the TIM information element to determine if the TIM information element describes data buffering for stations if the block index from the AID falls within the range of block indexes identified by a start block index and/or an end block index. If so, the communications device 1030 may repeat the process of parsing the association identifier and comparing the values of the block and sub-block with those represented by the TIM information element to determine whether the TIM information element indicates that the communications device 1010 is buffering data for the communications device 1030 and/or whether the TIM information element includes data at the bit position in the sub-block associated with the communications device 1030 that indicates that the communications device 1010 is buffering data for the communications device 1030. In many embodiments, mapping function logic 1033 of the communications device 1030 may also determine the number of stations in the TIM bitmap prior to the position of the bit for the communications device 1030 that have data buffered by the communications device 1010.

In other embodiments, the TIM information element may include a TIM bitmap that is a TIM segment. The TIM segment may represent part of one page of the traffic indication map and may be associated with a TIM segment number as well as a starting block and a block range. In some of these embodiments, the communications device 1030 may determine whether the TIM bitmap includes the block of the traffic indication map covering the communications device 1030 by the TIM segment number. Thereafter, the communications device 1030 may parse the blocks and sub-blocks to determine whether or not the communications device 1010 is buffering data for the communications device 1030 and, in some embodiments, the number of paged stations prior to the communications device 1030 within the TIM bitmap.

If the restricted access window is not limited to paged stations, then the restricted access window is open to paged and unpaged stations associated with the TIM bitmap in the TIM information element. In such embodiments, the communications device 1030 may verify that the TIM bitmap covers the association identifier (AID) for the communications device 1030 and, if so, the communications device 1030 may determine that the position of the AID for the communications device 1030 is the AID or a portion of the AID such as the last several bits.

In addition to determining the position of the communications device's 1030 AID within the TIM bitmap, the mapping function logic 1033 may parse and interpret RAW PS IE to determine the RAW duration (Traw) and the slot duration (Ts). From the RAW duration and the slot duration, the mapping function logic 1033 may derive the number of slots in a RAW (Nraw) by dividing the RAW duration (TRAW) with the slot duration (Ts).

In the present embodiment, the mapping function logic 1033 may implement a station-slot mapping function of $f(x)=(x+Noffset) \mod Nraw$, wherein mod is modulo, $f(x)$ is the slot assignment for the station in the RAW, and Noffset is an offset value in the mapping function that is provided to address fairness among the stations indicated in the TIM. The offset may be determined by any means and may change over the course of one or more beacon intervals so that the slots assigned to the stations will vary.

In some embodiments, the Noffset may be a field received in a beacon frame from the communications device 1010 and may vary with each beacon interval or periodically after a particular number of beacon intervals. In one embodiment, the mapping function logic 1033 may determine the offset based upon bits in one or more fields of the beacon frame such as one or more bits of the timestamp, the FCS, the TIM bitmap, the frame body, the MAC header, and/or the like. In further embodiments, the mapping function logic 1033 may determine the offset by performing a calculation with one or more values or bits from the beacon frame or another frame such as dividing the timestamp by the beacon interval.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sub-layer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as a management frame structure and a traffic indication map (TIM) information element based upon a hierarchical data structure such as the hierarchical data structure 1100 illustrated in FIG. 1A. Furthermore, the memory 1011 and 1031 may comprise at least a portion of a traffic indication map in a hierarchical data structure that identifies the associated stations for which data is buffered. For example, the memory 1011 may comprise an indication that the communications device 1010 comprises buffered data as well as a reference or link to the buffered data for the communications device 1030. In some embodiments, the memory 1031 may comprise a calculation for the station-to-slot mapping function and, in further embodiments, the memory 1031 may comprise a count, at least temporarily, of the number of paged stations in the TIM bitmap prior to the position of the communications device 1030 AID in the TIM bitmap.

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. For example, the frame builder 1013 may generate frames with a TIM IE and RAW PS IE 1014 and the data unit builder of the physical layer logic 1019 may encapsulate the frames with preambles to generate PPDUs for transmission via a physical layer device such as the transceivers (RX/TX) 1020 and 1040.

The frame with the TIM information element and the RAW PS IE 1014 may comprise a frame such as the management frame 1500 in FIG. 1F or 1700 in FIG. 1H. In particular, the frame with the TIM information element 1014 may comprise a TIM bitmap based upon a hierarchical data structure such as the TIM bitmap 1700 illustrated in FIG. 1E and may identify each station within, e.g., one page, that has data buffered by an AP such as communications device 1010. For example, the AP may not arbitrarily transmit MSDUs to stations operating in a power saving (PS) mode, but may buffer the MSDUs and only transmit the MSDUs at designated times. Furthermore, the stations that currently have buffered MSDUs within the AP may be identified in frame comprising a TIM information element, which may be included, e.g., as an element within beacon frames generated by the AP. Then, each station may determine that an MSDU is buffered for the station (such as communications device 1030) by receiving and interpreting the TIM information element in the beacon frame. The station may interpret the TIM element by determining whether the page including their AID is included in the TIM element, determining whether the block index of their AIDs is included within the range of block indexes described in the element, determining whether the block with their AID is included in the TIM element, and, if so, determining whether the TIM element indicates that the value associated with their AID indicates that data is being buffered at the AP. In a base service set (BSS) operating under a distributed coordination function (DCF), upon determining that an MSDU is currently buffered in the AP, a station operating in the PS mode may transmit a PS Poll frame to the AP, which may respond with the corresponding buffered MSDU immediately, or acknowledge the PS Poll and respond with the corresponding MSDU at a later time.

In some embodiments, the communications device 1010 may protect the PS Poll/Trigger frames by setting the network allocation vector (NAV). In many embodiments, the paged station can ignore the NAV set by the communications device 1010. In several embodiments, if NAV is set, then only paged stations (STAs) can send PS Poll/Trigger frames during the RAW.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal subcarrier signals are used to carry data. The data is divided into several parallel data streams or channels, one for each subcarrier. Each sub-carrier is modulated with a modulation scheme at a low symbol rate, maintaining total data rates similar to conventional single-carrier modulation schemes in the same bandwidth.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a hierarchical data structure 1100 for traffic indication mapping with four pages and 32 blocks per page. On the top level of the hierarchy, the traffic indication virtual map may be divided into four pages. Each page may support up to 2048 stations and, in several embodiments, each page may be transmitted as a partial virtual bitmap in a separate TIM information element. In some embodiments, multiple TIM information elements may be transmitted in the same medium access control (MAC) service data unit (MSDU). In further embodiments, multiple MSDUs may be aggregated in each physical layer (PHY) protocol data units (PPDUs). In other embodiments, the hierarchical data structure 1100 may comprise more or less than four pages.

Each page illustrated comprises up to 32 blocks per page and each of the 32 blocks may support up to 64 of the stations. Each block may comprise eight sub-blocks. Each sub-block may be one octet in length and may support eight of the stations associated with the corresponding block. In further embodiments, each block may comprise more or less than eight sub-blocks and each of the sub-blocks may be more or less than one octet in length.

Each bit of a sub-block may correspond to a different association identifier (AID) and thus, each bit may uniquely identify a station. In the present embodiment, the bit may be set to 1 if there is data buffered at the AP. Otherwise, the bit may be cleared to 0.

FIG. 1B depicts an embodiment of an association identifier structure 1150 for the hierarchical data structure illustrated in FIG. 1A. In the present embodiment, the AID comprises 13 bits. In other embodiments, the AID structure 1150 may comprise more or less than 13 bits.

In the present embodiment, the AID structure 1150 may comprise a page identifier (ID) having two bits (b12-b11), which is represented as "a" in the AID equation depicted below the AID structure 1150. The AID structure 1150 may comprise a page ID/block index extension having two bits (b10-b9), which is represented as "b" in the AID equation. The page ID/block index extension may facilitate a greater ratio of pages per block or blocks per page. The AID structure 1150 may comprise a block index having three bits (b8-b6), which is represented as "c" in the AID equation. The AID structure 1150 may comprise a sub-block index having three bits (b5-b3), which is represented as "d" in the AID equation. And, the AID structure 1150 may comprise a station bit position index having three bits (b2-b0), which is represented as "e" in the AID equation.

The AID equation may describe the calculation of a unique number per station based upon the hierarchical data structure illustrated in FIG. 1A. In particular, the AID unique number in this embodiment may be calculated by the following formula:

$$AID=((((\text{Page ID}\times 4+(\text{Page ID/Block index extension}-1))\times 8+(\text{Block index}-1))\times 8+(\text{Sub-block index}-1))\times 8+(\text{station bit position index})$$

To illustrate, if the variables are: the Page ID=0, the page ID/block index=1, the block index=2, the sub-block index=6. As a result, the equation becomes:

$$AID=((((0\times 4+(1-1))\times 8+(2-1))\times 8+(6-1))\times 8+(4)=108$$

Figure 1C:
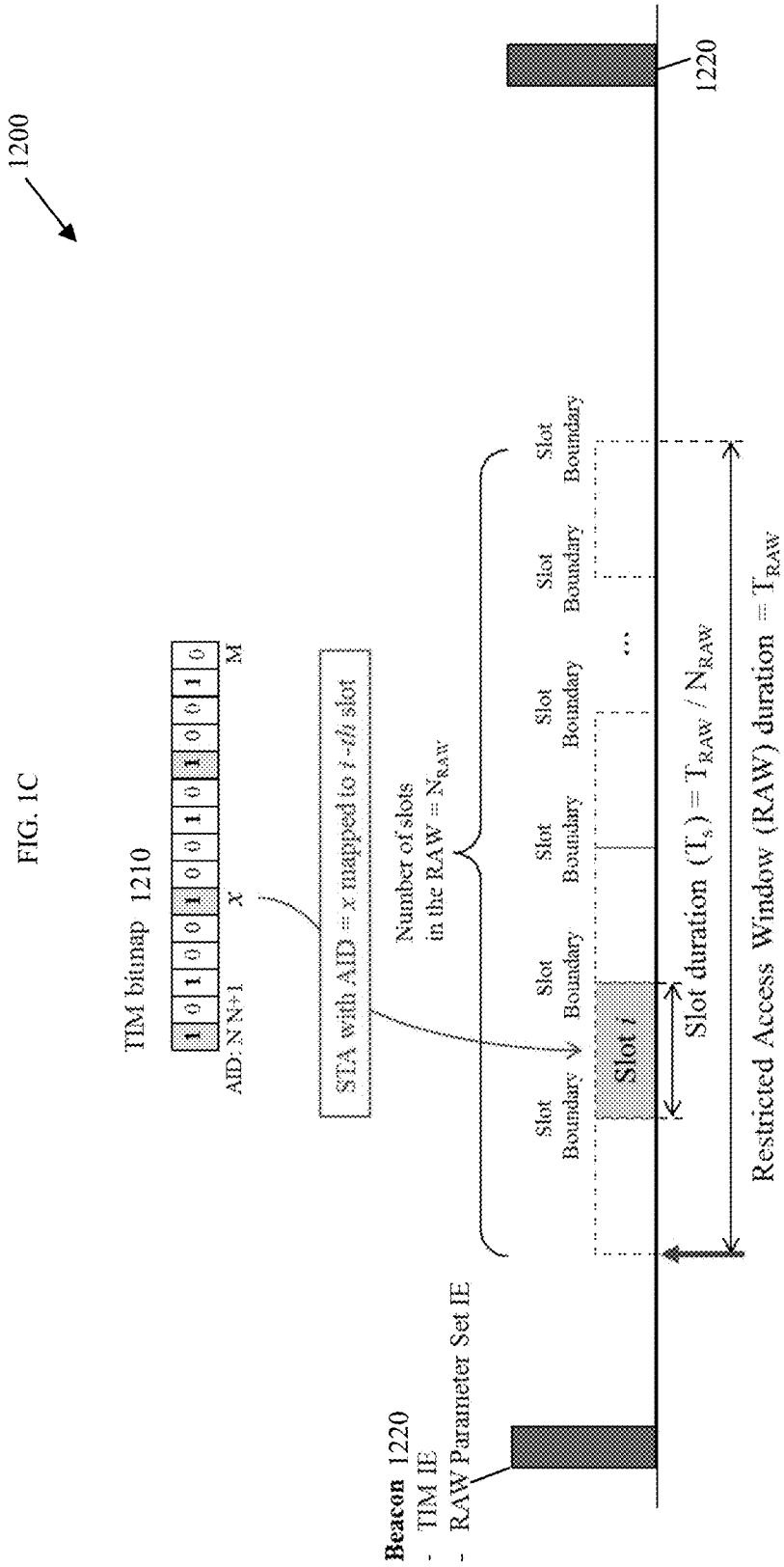
FIGS. 1C-E depict embodiments for assigning slots in a restricted access window based upon a traffic indication map element bitmap.
Figure 1D:
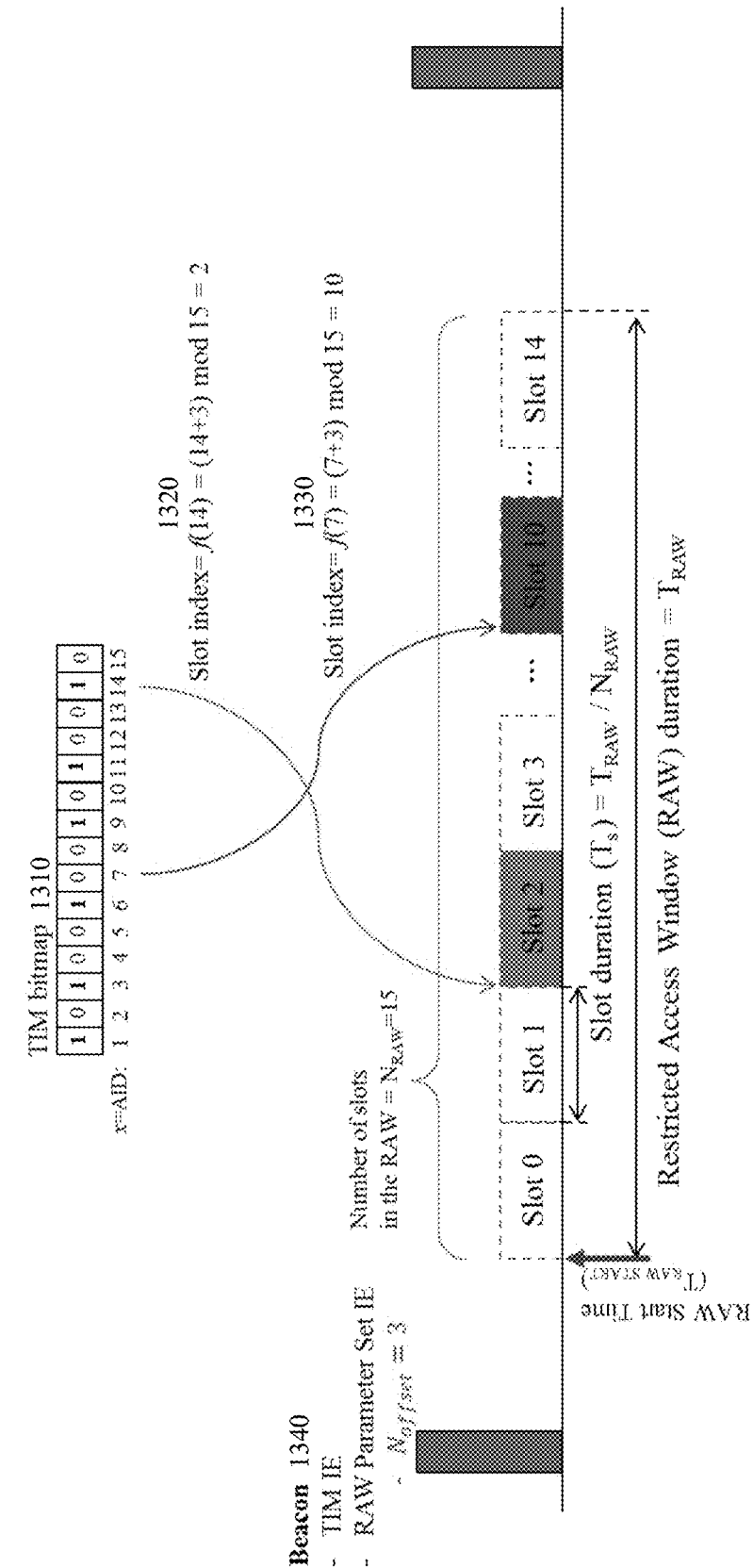
Figure 1E:
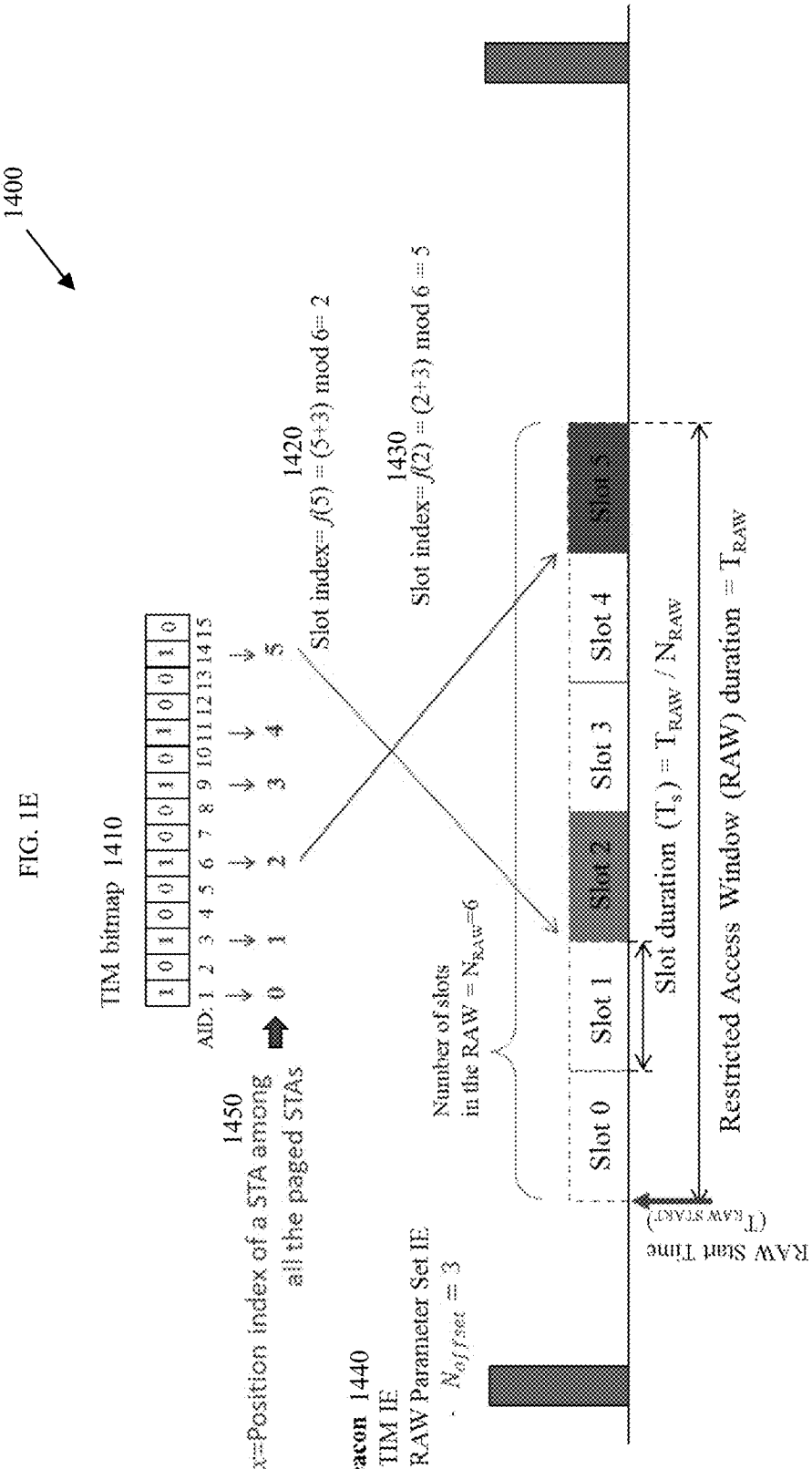

FIGS. 1C-E depict embodiments for assigning slots in a restricted access window based upon a traffic indication map element bitmap. In particular, FIG. 1C depicts an embodiment of a restricted access window 1200 defined by a beacon interval between beacons 1220. In the present embodiments, the beacon 1220 comprises a TIM information element and a RAW parameter set (PS) information element (IE). The TIM IE comprises a TIM bitmap 1210 and the RAW PS IE comprises indications of a RAW duration (Traw) and a RAW slot duration (Ts). A mapping function logic of a station having an AID represented by the position x below the TIM bitmap 1220 may map the station-to-slot i in the RAW. More specifically, the mapping function may determine the number of slots (Nraw) based on Traw/Ts and may determine the ith slot based on X mod Nraw or (X+Noffset) mod Nraw. In many embodiments, the offset (Noffset) may comprise the FCS value from the beacon 1220.

FIG. 1D depicts an embodiment of a restricted access window 1300 defined by a beacon interval between beacons such as beacon 1340. In the present embodiments, the beacon 1340 comprises a TIM information element and a RAW parameter set (PS) information element (IE). The TIM IE comprises a TIM bitmap 1310 and the RAW PS IE comprises indications of a RAW duration (Traw), a RAW slot duration (Ts), a RAW start time (Traw start), and an offset field (Noffset) having a value of 3. In the present embodiment, both the paged and the unpaged stations may access the RAW. A mapping function logic may determine the number of slots as Nraw=15 so the RAW has slots 0 through 14. The mapping function logic may also determine that the position X for a station is the AID. In some embodiments, the station-to-slot mapping function may then be X modulus Nraw=i slot (the slot assigned to the station), wherein X is the position of the station. In several embodiments, the slots of the AID may be mapped one-to-one to the positions of the stations identified in the AID, i.e., both the paged and unpaged stations identified in a TIM bitmap 1310. For example, the mapping function logic 1320 may determine that the position X for a station with the AID=14 is 14 and the slot index=(14+3) mod 15=2. So the slot for the station with the AID of 14 is slot 2. The mapping function logic 1330 may determine that the position X for a station is the AID and the mapping function logic 1330 may determine that the position X for a station with the AID=7 is 14 and the slot index=(7+3) mod 15=10. So the slot for the station with the AID of 7 is slot 10. Note that while the AIDs and offsets discussed herein are relatively small numbers, the modulo function determines a slot index between zero and Nraw in any function modulo Nraw and with any numbers.

FIG. 1E depicts an embodiment of a restricted access window 1400 defined by a beacon interval between beacons such as beacon 1440. In the present embodiments, the beacon 1440 comprises a TIM information element and a RAW parameter set (PS) information element (IE). The TIM IE comprises a TIM bitmap 1410 and the RAW PS IE comprises indications of a RAW duration (Traw), a RAW slot duration (Ts), a RAW start time (Traw start), and an FCS with a value of 3 that is used by the mapping function logic as the offset. In several embodiments, each station may be assigned with a slot boundary in a RAW at which time the station is allowed to start to contend for channel access. One way to signal mapping between STAs and slots in a RAW is to use the information provided in TIM IE and RAW PS IE in a pre-defined a STA-to-slot mapping function. For example, in many embodiments, the MAC logic of a station may obtain the RAW duration (Traw) and the slot duration (Ts) defined in the RAW PS IE. The station may derive the number of slots in a RAW (Nraw) by dividing the RAW duration (Traw) with the slot duration (Ts), Nraw=Traw/Ts.

In the present embodiment, only the paged stations may access the RAW. A mapping function logic may determine the number of slots as Nraw=6 so the RAW has slots 0 through 5. The mapping function logic may also determine that the position X for a station is the position index of the station among all the paged stations 1450. For example, the mapping function logic 1420 may determine that the position X for a station with the AID=14 is 5 because the station is the fifth paged station in the TIM bitmap 1410 or the fifth station that has data buffered at the AP. The slot index for the station with the AID=14, X=5 is slot index=(5+3) mod 6=2. So the slot for the station with the AID of 14 is slot 2. The mapping function logic 1430 may determine that the position X for a station with the AID=6 is 2 and the slot index=(2+3) mod 6=5. So the slot for the station with the AID of 6 is slot 5.

FIGS. 1F-I depict embodiments of management frames and frame elements for determining a slot assignment for a station in a restricted access window. In particular, FIG. 1F depicts an embodiment of a management frame 1500 for communications between wireless communication devices such as communications devices 1010, 1030, 1050, and 1055 in FIG. 1. The management frame 1500 may comprise a MAC header 1501, a frame body 1514, and a frame check sequence (FCS) field 1526. The MAC header 1501 may comprise the frame control field 1502 and other MAC header fields 1508. The frame control field 1502 may be two octets and may identify the type and subtype of the frame such as a management type and, e.g., a beacon frame subtype. The other MAC header fields 1508 may comprise, for example, one or more address fields, identification fields, control fields, or the like.

In some embodiments, the management frame 1500 may comprise a frame body 1514. The frame body 1514 may be a variable number of octets and may include data elements, control elements, or parameters and capabilities. In the present embodiment, the frame body 1514 comprises a traffic indication map (TIM) element 1520.

In many embodiments, the management frame 1500 may comprise a frame check sequence (FCS) field 1526. The FCS field 1526 may be four octets and may include extra checksum characters added to the frame 1500 for error detection and correction. In some embodiments, the FCS field 1526 value may be used as an offset in the station-to-slot mapping function.

FIG. 1G illustrates an embodiment of a TIM information element 1600. An access point (AP) may transmit the TIM information element 1300 to inform stations such as low power sensors that the AP is buffering data for the station. In many embodiments, the station may then initiate communications with the AP to obtain the buffered data such as via a poll frame. In other embodiments, the AP may transmit the data to the station after transmitting the beacon.

The TIM information element 1600 may comprise fields such as an element identifier (ID) field 1602, a length field 1606, a delivery TIM (DTIM) count field 1608, a DTIM period field 1610, a TIM parameter field 1611, a TIM bitmap control field 1612, and TIM bitmap 1614. The element ID field 1602 may be one octet and may identify the element as a TIM information element 1600. The length field 1606 may be one octet and may define the length of the TIM information element 1600 or the length of a portion thereof. The DTIM count 1608 may be one octet and may indicate how many beacon frames (including the current frame) appear before the next DTIM frame. A DTIM Count field 1608 value of 0 may indicate that the current TIM information element frame is a DTIM frame. For instance, immediately after every DTIM (beacon frame with DTIM Count field 1608 of the TIM information element 1600 equal to zero), the AP may transmit all buffered, group-addressed frames. If the TIM indicating the buffered MSDU or aggregate MSDU (A-MSDU) is sent during a contention-free period (CFP), a contention-free (CF)-Pollable station operating in the power-savings (PS) mode does not send a power-saving (PS)-Poll frame, but remains active until the buffered MSDU or A-MSDU is received (or the CFP ends). If any station in its base service set (BSS) is in PS mode, the AP may buffer all group-addressed MSDUs and deliver them to all stations immediately following the next beacon frame containing a DTIM transmission.

The DTIM period field 1610 may be one octet and may indicate the number of beacon intervals between successive DTIMs. In many embodiments, if all TIM information element frames are DTIMs, the DTIM period field 1610 may have the value 1.

The TIM parameter field 1611 may comprise the values of Np and Nb. For instance, an embodiment of the TIM parameter field 1600 may comprise a number of pages (Np) field and a number of blocks per page (Nb) field.

The TIM bitmap control field 1612 may be one or two octets and may describe the content of the TIM bitmap 1614. For instance, the TIM bitmap control field 1612 may include a bit such as bit 0 that contains a traffic indicator bit associated with Group Address Buffered Data 0. This bit may be set to 1 in TIM information element 1600 with a value of 0 in the DTIM Count field 1608 when one or more group-addressed frames are buffered at the AP.

FIG. 1H depicts an embodiment of a management frame 1700 such as a short beacon frame for communications between wireless communication devices such as communications devices 1010, 1030, 1050, and 1055 in FIG. 1. The management frame 1700 may comprise a MAC header 1701, a frame body (an optional IEs field) 1714, and a cyclic redundancy check (CRC) field 1726. The MAC header 1701 may comprise the frame control field 1702 and other MAC header fields 1708. The frame control field 1702 may be two octets and may identify the type and subtype of the frame such as a management type and, e.g., a short beacon frame subtype. The other MAC header fields 1708 may comprise, for example, one or more address fields, identification fields, control fields, or the like.

In some embodiments, the management frame 1700 may comprise a frame body 1714. The frame body 1714 may be a variable number of octets and may include data elements, control elements, or parameters and capabilities. In the present embodiment, the frame body 1714 comprises a restricted access window (RAW) parameter set (PS) information element (IE) 1720.

FIG. 1I illustrates an embodiment of a RAW PS IE 1800. The RAW information element 1800 may comprise fields such as an element identifier (ID) field 1802, a length field 1806, a page index (ID) field 1808, a block offset field 1810, a block range field 1812, a RAW start time field 1814, a RAW duration field 1815, a paged STA only field 1816, a group/resource allocation field 1818, and a slot definition field 1820. The element ID field 1802 may identify the element as a RAW PS IE 1800. The length field 1806 may define the length of the RAW element 1800 or the length of a portion thereof. The page ID field 1808 may indicate the page index for hierarchical AID (based on hierarchical AID) of the allocated group. The block offset field 1810 may indicate the starting block index of the allocated group. The block range field 1812 may indicate the number of blocks (starting from the block offset) for the allocated group. The RAW start time field 1814 may indicate the duration in time units (TU) from end of beacon transmission to RAW Start time. The RAW duration field 1815 may indicate the duration of RAW in time units (TU). The paged STA only field 1816 may comprise two bits and may set Bit 1 to 1 if only STAs with their TIM bit set to 1 are allowed to perform uplink (UL) transmissions. Bit 2 may be set to 1 if RAW is reserved for frames with duration smaller than slot duration, such as PS Polls/trigger frames. In some embodiments, Bit 2 may be ignored if Bit 1 is not set.

The Group/Resource allocation field 1818 may be set to 1 to indicate if STAs need to wake up at the beginning of the RAW to receive group addressed frames such as resource allocation. And the slot definition field 1820 may include, e.g., a slot duration and, in some embodiments, an indication regarding whether transmissions within the RAW may cross a slot boundary. For instance, the AP may indicate whether or not a transmission opportunity (TXOP) or transmission within a TXOP shall not extend across a slot boundary. If this TXOP rule is applied, the STA does not wait for ProbeDelay when waking up at the slot boundary.

Figure 2:
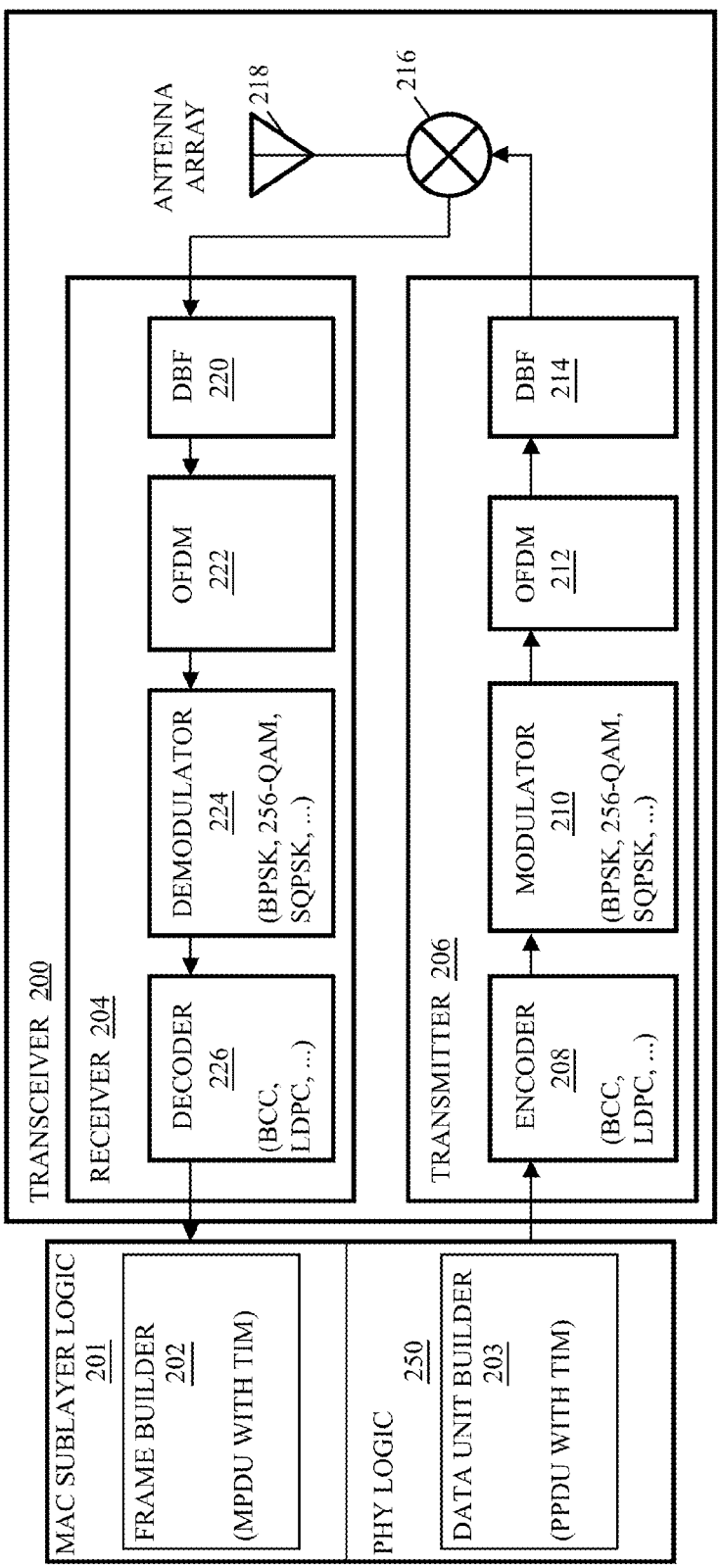
FIG. 2 depicts an embodiment of an apparatus to generate, transmit, receive and interpret a frame with a partial virtual bitmap based upon a hierarchical data structure for traffic indication mapping.

FIG. 2 depicts an embodiment of an apparatus to generate, transmit, receive, and interpret or decode a frame such as the frame 1014 in FIG. 1. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by encapsulating the frame or multiple frames, MAC protocol data units (MPDUs), with a preamble to transmit via transceiver 200.

In many embodiments, the MAC sublayer logic 201 may comprise a frame builder 202 to generate frames such a control frame like a PS Poll. For a station operating in the PS mode, the MAC sublayer logic 201 may transmit a PS Poll frame to the AP, which may respond with the corresponding buffered MAC service data unit (MSDU) immediately, or acknowledge the PS Poll and respond with the corresponding MSDU at a later time. The TIM information elements may comprise data indicative of MSDUs buffered or stored by an associated AP for particular stations associated with the AP.

The PHY logic 250 may comprise a data unit builder 203. The data unit builder 203 may determine a preamble to encapsulate the MPDU or more than one MPDUs to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal subcarriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU or more than one MPDUs, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may decode or parse the MPDU or MPDUs to determine the particular type of frame or frames and identify one or more information elements included in the MPDU(s). For instance, the information elements may comprise a TIM information element and/or a RAW PS information element.

FIG. 3 depicts an embodiment of a flowchart 300 to determine a slot assignment by a station such as the communications device 1030 described in conjunction with FIG. 1. The station may wake at a target beacon transmission time (TBTT) to receive a beacon from an access point with which the station is associated. In some embodiments, the beacon may comprise a traffic indication map bitmap in a traffic indication map bitmap information element as well as a restricted access window slot duration and a restricted access window duration in a restricted access window parameter set element. In further embodiments, the station in a prior communication with the AP may have received some of this information.

Based upon this information, the station may determine the position of the station AID in the TIM bitmap of the TIM information element (element 305). More specifically, the station may comprise mapping function logic to determine the slot assignment for the station based upon the traffic indication map bitmap, the restricted access window slot duration, and the restricted access window duration. In many embodiments, if the access point set the RAW for both paged and unpaged stations, the position of the station in the TIM bitmap is the AID of the station or a portion thereof such as the last few or several bits of the AID. On the other hand, if the RAW is restricted to paged stations only, the position of the station is the position index of the (paged) station among all the paged stations when sequentially arranged based on their AIDs. For example, if the station is the first station in the TIM bitmap that is paged, then the position of the station is zero. And, if the position of the station is the 12th station in the TIM bitmap but the station is the fifth station that is paged, the position of the station is four. In other embodiments, the position of the first station may be one and, in further embodiments, the position of the first station may be a number other than zero and one.

After determining the position of the station, the mapping function logic may determine the restricted access window slot duration and the restricted access window duration to determine the number of slots in the restricted access window (element 310). The station may determine the number of slots by dividing the restricted access window duration by the restricted access window slot duration. In other embodiments, additional or alternative factors may be calculated to the number of slots.

After determining the number of slots, the mapping function logic may correlate the position of the station's AID in the traffic indication map bitmap with the number of slots to determine the slot assignment for the station (element 315). For example, the mapping function logic may assume an even distribution or nearly even distribution of the stations across the number of slots so the mapping function may divide the stations amongst the number of slots. In one embodiment, the mapping function logic may implement an equation to determine the slot assignments such as the position of the station modulo the number of slots.

In another embodiment, the mapping function logic may apply an offset that changes periodically such as each beacon interval to promote fair access to the channel amongst the stations. For instance, the slot assignment may be the calculated as the sum of the position and the offset modulo the number of slots. As the offset changes, the stations with access to the first slot will change.

In some embodiments, the access point may provide the offset in, e.g., a beacon frame in, e.g., an offset field. In other embodiments, the offset may be determined by selecting a value as the offset or utilizing the selected value to calculate the offset. For instance, the offset may be all or part of the value in an FCS field, the value in a timestamp field, or another field. Or the offset may be a timestamp divided by or multiplied by a beacon interval value.

In further embodiments, the mapping function logic may divide the number of stations by the number of slots and if the position falls within the number then the station is in the first slot. If the position falls is greater than the number but less than two times the number, then the station is in the second slot. If the position falls is greater than two times the number but less than three times the number, then the station is in the third slot and so on.

After determining the slot assignment for the station, the station may enter a sleep state or low power consumption state until the slot. The station may wake at the slot and begin to contend for access at the slot boundary based upon enhanced distributed channel access (EDCA) (element 320). The EDCA may provide different levels of priority to stations by adjusting a timeframe that the station must wait prior to accessing the channel. In other words, stations with a higher priority may wait less time and begin to access the channel while a lower priority device is waiting. The lower priority device may then wait until the higher priority device completes the communication before beginning or may have to wait until a subsequent slot assignment.

FIGS. 4A-B depict embodiments of flowcharts 400 and 450 to transmit, receive, and interpret or decode communications with a management frame such as beacon frames illustrated in FIGS. 1C-G. Referring to FIG. 4A, the flowchart 400 may begin with receiving a frame from the frame builder such as a PS Poll frame. The PS Poll frame may be responsive to receiving TIM information element.

The MAC sublayer logic of the communications device may generate the frame as a control frame to transmit to the AP and may pass the frame as an MPDU to a data unit builder that transforms the data into a packet that can be transmitted to a station. The data unit builder may generate a preamble to encapsulate one or more of the MPDUs from the frame builder to form a PPDU for transmission (element 405). The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

The STA may transmit the PS Poll or another trigger frame to the AP not earlier than the slot boundary of its channel access slot based on EDCA. The AP may indicate to a station, that it will be sending traffic to a station not earlier than a given downlink bufferable unit delivery slot. In some embodiments, a management frame from the AP may indicate the downlink bufferable unit delivery slot for each station after all PS Poll frame transmission completed.

In some embodiments, the AP may protect the PS Poll/Trigger frames by setting the network allocation vector (NAV). In several embodiments, the paged stations may ignore the NAV set by the AP. If NAV is set, then only paged stations can send PS Poll/Trigger frames during the restricted access window.

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the TIM element in each of the MPDUs. For instance, the MAC sublayer logic may parse the TIM element to determine the value of the TIM segment number field, the page ID field, one or more block offset fields, a block control field for one or more blocks, possibly a block bitmap field, and possibly the sub-block bitmap fields for one or more sub-block bitmaps to determine whether the bit associated with the AID for the receiving station indicates that the AP is buffering data for the station (element 470). In some embodiments, the MAC sublayer logic may determine whether the other fields in the TIM element(s) indicate that the data will be broadcast to a group of devices after receipt of the beacon comprising the TIM element, or if the AP will await a frame from the station instructing the AP to send the frame.

The following examples pertain to further embodiments. One example comprises a method. The method may involve receiving one or more frames comprising a traffic indication map bitmap, a restricted access window slot duration, and a restricted access window duration; determining a number of slots in the restricted access window; determining, based upon a station-to-slot mapping function, an association between a station and a slot in the restricted access window based upon the position of the station in the traffic indication map bitmap; and contending for access to an access point in the slot of the restricted access window.

In some embodiments, the method may further comprise storing a traffic indication map bitmap in a memory. In some embodiments, the station-to-slot mapping function comprises a sum of a position of the station in a traffic indication bitmap (x) and an offset (Noffset) modulo a number of slots (Nraw) in a restricted access window or f(x)=(x+Noffset) mod Nraw. In many embodiments, the station-to-slot mapping function comprises an offset, wherein the offset changes the station-to-slot mapping function to provide fair access to stations associated with the restricted access window. In several embodiments, the offset is determined via an offset field in a beacon frame from the access point. In some embodiments, the offset is determined via one or more fields comprising a timestamp, FCS, and a beacon interval field in a beacon frame from the access point.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a memory; logic coupled with the memory to receive one or more frames comprising a traffic indication map bitmap, a restricted access window slot duration, and a restricted access window duration; determine a number of slots in the restricted access window; determine, based upon a station-to-slot mapping function, an association between a station and a slot in the restricted access window based upon the position of the station in the traffic indication map bitmap; and contend for access to an access point in the slot of the restricted access window.

In some embodiments, the apparatus may further comprise a receiver coupled with the logic and an antenna to receive the frame. In some embodiments, the station-to-slot mapping function comprises a sum of a position of the station in a traffic indication bitmap (x) and an offset (Noffset) modulo a number of slots (Nraw) in a restricted access window, f(x)=(x+Noffset) mod Nraw. In some embodiments, the station-to-slot mapping function comprises an offset, wherein the offset changes the station-to-slot mapping function to provide fair access to stations associated with the restricted access window. In some embodiments, the offset is determined via an offset field in a beacon frame from the access point. In some embodiments, the offset is determined via one or more fields of a beacon frame. And in some embodiments of the apparatus, the logic comprises logic to generate the offset, wherein the offset is determined based upon a timestamp divided by a beacon interval field in a beacon frame from the access point.

Another example comprises a program product. The program product may comprise a medium containing instructions to determine a slot assignment for a restricted access window, wherein the instructions, when executed by the access point, causes the access point to perform operations, the operations comprising: receiving one or more frames comprising a traffic indication map bitmap, a restricted access window slot duration, and the restricted access window duration; determining a number of slots in the restricted access window; determining, based upon a station-to-slot mapping function, an association between a station and a slot in the restricted access window based upon the position of the station in the traffic indication map bitmap; and contending for access to an access point in the slot of the restricted access window.

In some embodiments, the operations further comprise storing a traffic indication map bitmap in a memory. In some embodiments, the station-to-slot mapping function comprises a sum of a position of the station in a traffic indication bitmap and an offset modulo a number of slots in a restricted access window. In many embodiments, the operations further comprise the station-to-slot mapping function comprises an offset, wherein the offset changes the station-to-slot mapping function between beacon intervals to provide fair access to stations associated with the restricted access window. In several embodiments, the operations further comprise the offset is determined via an offset field in a beacon frame from the access point. And, in some embodiments, the operations further comprise the offset is determined via one or more fields comprising a timestamp, FCS, and a beacon interval field in a beacon frame from the access point.

Another example comprises a system. The system may comprise a memory; logic coupled with the memory to receive one or more frames comprising a traffic indication map bitmap, a restricted access window slot duration, and a restricted access window duration; determine a number of slots in the restricted access window; determine, based upon a station-to-slot mapping function, an association between a station and a slot in the restricted access window based upon the position of the station in the traffic indication map bitmap; and contend for access to an access point in the slot of the restricted access window; and a transmitter coupled with the medium access control logic and an antenna to transmit the frame.

In some embodiments, the logic comprises logic to transmit a frame comprising an offset for the station-to-slot mapping function. In some embodiments, the station-to-slot mapping function comprises a sum of a position of the station in a traffic indication bitmap and an offset modulo a number of slots in a restricted access window. In many embodiments, the station-to-slot mapping function comprises an offset, wherein the offset changes the station-to-slot mapping function to provide fair access to stations associated with the restricted access window. In several embodiments, the offset is determined via an offset field in a beacon frame from the access point. In some embodiments, the offset is determined via one or more fields of a beacon frame. And, in some embodiments, the logic comprises logic to generate the offset, wherein the offset is determined based upon a timestamp divided by a beacon interval field in a beacon frame from the access point.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. A method comprising:

receiving, by a station, one or more frames comprising a traffic indication map (TIM) bitmap, a restricted access window slot duration, and a restricted access window duration;

determining, by the station, a number of slots in a restricted access window (RAW);

determining, by the station, based upon a mapping function, an index of a time slot, in which the station is allowed to start contending for a medium based on the mapping function; wherein the mapping function is (x+Noffset) mod Nraw; wherein x is a position index of an association identifier (AID) of the station if the RAW is restricted to stations whose AID bits in the TIM bitmap are set to 1; wherein, if the RAW is not restricted to stations whose AID bits in the TIM bitmap are set to 1, x is the AID of the station; wherein the Noffset is an offset value in the mapping function; wherein the Nraw is a number of time slots in the RAW; and contending, by the station, for access to an access point in the slot of the RAW.

2. The method of claim 1, further comprising storing a traffic indication map bitmap in a memory.

3. The method of claim 1, further comprising determining the Noffset based upon art of a frame check sequence FCS field of a beacon frame.

4. The method of claim 1, further comprising determining the Noffset via an offset field in a beacon frame from the access point.

5. The method of claim 1, further comprising determining the Noffset via one or more fields comprising a timestamp, FCS, and a beacon interval field in a beacon frame from the access point.

6. A device comprising:

a memory to store logic; and a processor coupled with the memory to execute the logic, the processor, upon execution of the logic, to perform operations, wherein the operations comprise operations to:

receive one or more frames comprising a traffic indication map (TIM) bitmap, a restricted access window slot duration, and a restricted access window duration;

determine a number of slots in a restricted access window (RAW);

determine, based upon a mapping function, an index of a time slot, in which the device is allowed to start contending for a medium based on the mapping function; wherein the mapping function is (x+Noffset) mod Nraw; wherein x is a position index of an association identifier (AID) of the device if the RAW is restricted to stations whose AID bits in the TIM bitmap are set to 1; wherein, if the RAW is not restricted to stations whose AID bits in the TIM bitmap are set to 1, x is the AID of the device; wherein the Noffset is an offset value in the mapping function; wherein the Nraw is a number of time slots in the RAW; and contend for access to an access point in the slot of the RAW.

7. The device of claim 6, further comprising a receiver coupled with the processor, a radio, and one or more antennas coupled with the radio to receive the frame.

8. The device of claim 6, wherein the mapping function comprises the Noffset that is determined based upon part of a frame check sequence FCS field of a beacon frame.

9. The device of claim 8, wherein the Noffset is determined via an offset field in a beacon frame from the access point.

10. The device of claim 8, wherein the Noffset is determined via one or more fields of a beacon frame.

11. The device of claim 8, wherein the logic comprises logic to generate the Noffset, wherein the Noffset is determined based upon a timestamp divided by a beacon interval field in a beacon frame from the access point.

12. A machine-accessible product comprising:
 a non-transitory medium containing instructions to assign slots in restricted access windows, wherein the instructions, when executed by the access point, causes the access point to perform operations, the operations comprising:
 receiving, by a station, one or more frames comprising a traffic indication map (TIM) bitmap, a restricted access window slot duration, and a restricted access window duration;
 determining, by the station, a number of slots in a restricted access window (RAW);
 determining, by the station, based upon a mapping function, an index of a time slot, in which the station is allowed to start contending for a medium based on the mapping function; wherein the mapping function is (x+Noffset) mod Nraw; wherein x is a position index of an association identifier (AID) of the station if the RAW is restricted to stations whose AID bits in the TIM bitmap are set to 1; wherein, if the RAW is not restricted to stations whose AID bits in the TIM bitmap are set to 1, x is the AID of the station; wherein the Noffset is an offset value in the mapping function; wherein the Nraw is a number of time slots in the RAW; and
 contending, by the station, for access to an access point in the slot of the RAW.

13. The machine accessible product of claim 12, wherein the operations further comprise storing a TIM bitmap in a memory.

14. The machine accessible product of claim 12, wherein the operations further comprise the mapping function established by the access point during association.

15. The machine accessible product of claim 12, wherein the operations further comprise the mapping function comprises determining the Noffset based upon part of a frame check sequence (FCS) field of a beacon frame.

16. The machine accessible product of claim 15, wherein the operations further comprise determining the Noffset via an offset field in a beacon frame from the access point.

17. The machine accessible product of claim 15, wherein the operations further comprise determining the Noffset via one or more fields comprising a timestamp, FCS, and a beacon interval field in a beacon frame from the access point.

18. A system comprising:
 a radio and one or more antennas;
 a memory to store logic;
 a processor coupled with the memory to execute the logic, the processor, upon execution of the logic, to perform operations, wherein the operations comprise operations to:
 receive one or more frames comprising a traffic indication map (TIM) bitmap, a restricted access window slot duration, and a restricted access window duration;
 determine a number of slots in a restricted access window (RAW);
 determine, based upon a mapping function, an index of a time slot, in which the system is allowed to start contending for a medium based on the mapping function; wherein the mapping function is (x+Noffset) mod Nraw; wherein x is a position index of an association identifier (AID) of the system if the RAW is restricted to stations whose AID bits in the TIM bitmap are set to 1; wherein, if the RAW is not restricted to stations whose AID bits in the TIM bitmap are set to 1, x is the AID of the system; wherein the Noffset is an offset value in the mapping function; wherein the Nraw is a number of time slots in the RAW; and
 contend for access to an access point in the slot of the RAW;
 and a transmitter coupled with the processor and coupled with the radio and the one or more antennas to transmit the frame.

19. The system of claim 18, wherein the logic comprises logic to transmit a frame comprising the offset for the mapping function.

20. The system of claim 18, wherein the mapping function comprises the Noffset that is determined based upon part of a frame check sequence FCS field of a beacon frame.

21. The system of claim 20, wherein the Noffset is determined via an offset field in a beacon frame from the access point.

22. The system of claim 20, wherein the Noffset is determined via one or more fields of a beacon frame.

23. The system of claim 20, wherein the logic comprises logic to generate the Noffset, wherein the Noffset is determined based upon a timestamp divided by a beacon interval field in a beacon frame from the access point.

* * * * *